April 20, 1943.  C. K. STEINS  2,316,898
REPAIR CONNECTOR FOR FLEXIBLE HOSE
Filed April 29, 1942
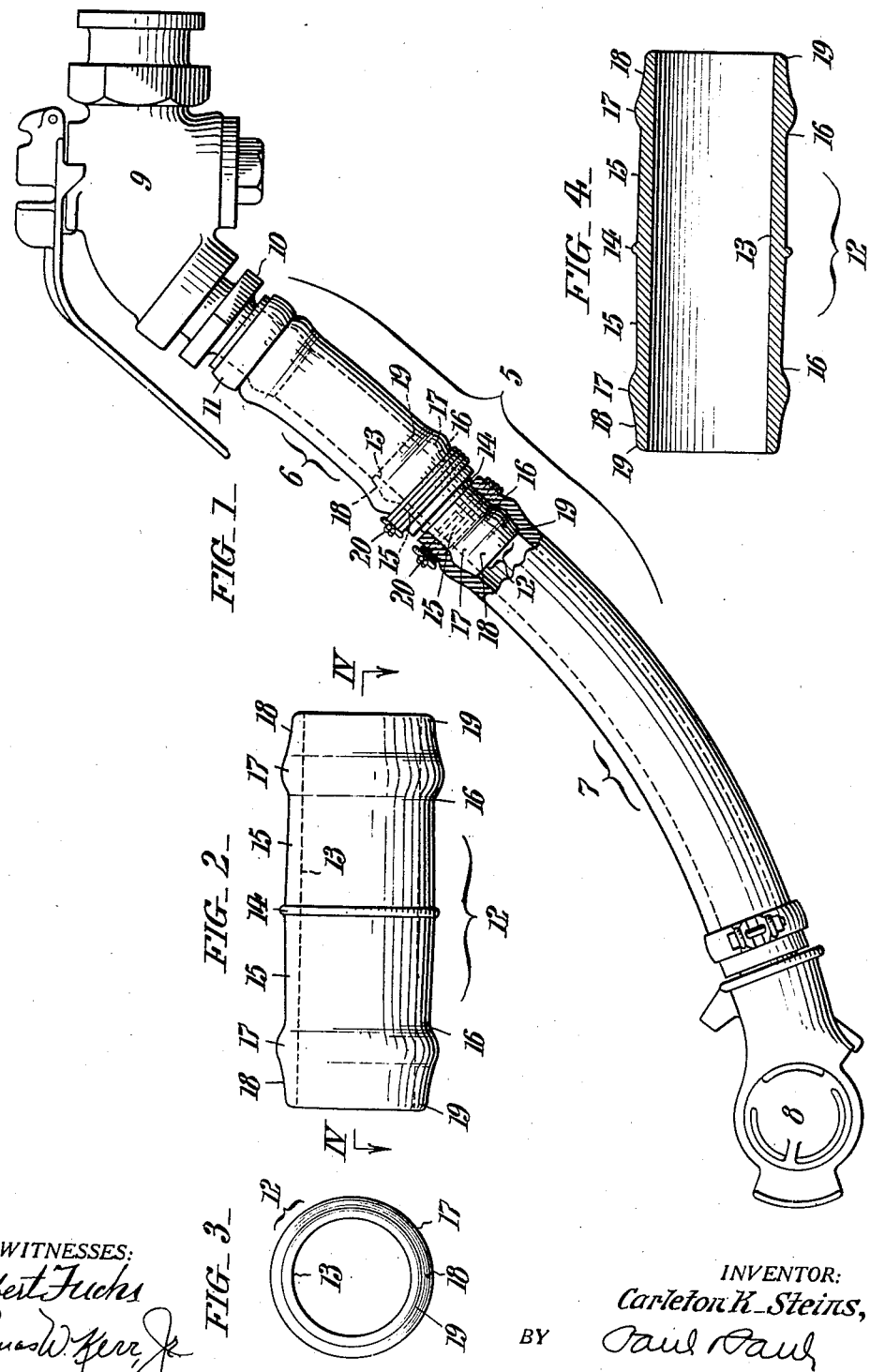
WITNESSES:
Hubert Fuchs
Thomas W. Kerr, Jr.
INVENTOR:
Carleton K. Steins,
BY 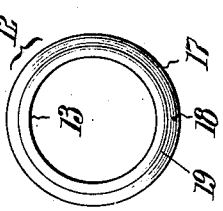
ATTORNEYS.

Patented Apr. 20, 1943

2,316,898

UNITED STATES PATENT OFFICE 2,316,898

REPAIR CONNECTOR FOR FLEXIBLE HOSE

Carleton K. Steins, Merion, Pa., assignor to The Pennsylvania Railroad Company, Philadelphia, Pa., a corporation of Pennsylvania Application April 29, 1942, Serial No. 441,055

1 Claim. (Cl. 285—76)

This invention has general reference to the connection of flexible hose and, more particularly, relates to the joining together of lengths of such hose end to end as commonly employed, in train service, for air-brake and signal line purposes; two such lengths being attached by a conventional coupling intermediate the angle-cocks of adjoining car ends, or between a car end and the locomotive or tender.

Heretofore when either or both of such lengths of train hose has become damaged or otherwise impaired for further useful service, the same has been discarded with incidental overhead loss; and the primary aim of this invention is to reclaim air brake and signal line hose by salvaging and splicing together the un-damaged or good portions of such discarded hose, whereby an economical saving in material is effected.

Another aim of this invention is the provision of a flexible hose joiner or connector which is designed to better ensure a fluid-tight connection between the parts thereby united, irrespective of the type of clamp employed.

With the stated aims and ancillary advantages in view, this invention essentially consists of the specially designed connector for flexible hose substantially as hereinafter disclosed, illustrated by the accompanying drawing forming a part of this specification, and more particularly defined in the concluding claim.

In the drawing:

Fig. 1 is a view of a length of brake-pipe hose as reclaimed and spliced in accordance with this invention, a fragmentary portion being in section, while a conventional railroad car anglecock is illustrated at one end thereof.

Fig. 2 is a detached view of the improved flexible hose connector, in accordance with the instant improvements.

Fig. 3 is an end view of the same; and,

Fig. 4 is a longitudinal section, taken on the plane IV—IV indicated in Fig. 2.

In describing the embodiment of this invention, exemplified by the above captioned figures, specific terms will be employed for the sake of clarity, but it is to be understood the scope of said invention is not thereby limited; each such term being intended to embrace all equivalents which perform the same function for an analogous purpose.

Referring further to the drawing, the reference character 5 comprehensively designates a standard length of air-brake hose for railroad service, as salvaged and spliced from two good portions 6, 7, of previously discarded and impaired similar lengths. This reclaimed length of hose 5 is provided at one end with a standard type of coupler 8 and, at the other end is attached to the angle-cock 9 by a regulation nipple 10, and clamping collar 11; in accordance with prevailing practice.

The improved connector 12 of this invention, as best understood from Figs. 2-4, inclusive, is made of tubular section metal, conveniently steel pipe, or as a casting, having a straight bore 13 of the requisite size for air brake, or signal line, hose; and with a medial rib or circumferential bead 14, preferably of half-round cross-section and minute dimension, such as one thirty-second of an inch radius, so that the adjoining ends of the portions 6, 7, when spliced, as later on explained, may be compressed to approximately mutual abutment so as to provide a juncture thereat which will be found positively leak-proof.

To each side of the bead 14, the body of the connector 12 is very slightly tapered outwards to define opposed complemental grip sections 15, merging by short radius arcs or fillets 16 into reversely directed bulbiform ends defining enlargements 17, which preferably have the root portions inward and, in turn, correspondingly merged into substantially greater curvatures that constitute the entering ends 18; said latter curvatures terminating in roundings 19 to facilitate smooth entering or passage into the hose ends 6, 7. Particular attention is directed to the fact that by forming the connector 12, as described, no angular edges exist which would tend to mar the effectiveness of the splice or produce surrounding leakage-conducive grooves; whereas substantial stretches of coupling or grip section 15 are furnished for engagement in the respective host portions 6, 7 connected thereby. It will be further noted in reference to Fig. 1 that the bulbiform shape of the ends of the improved connector 12 impose very little expansive strain on the connected hose portions 6, 7 but, on the contrary, said connector affords what may be termed continuous gripping surfaces from the medial bead 14, outwards, over the bulbiform ends that are totally devoid of any distortive trend. In other words, substantially the entire exterior surface of the joiner 12 is rendered "active" for gripping purposes whereby a very effective and superior splice for heretofore discarded sections or short lengths of hose, is provided.

After insertion of the connector 12 in the adjoining ends of the hose portions 6, 7, appropriate clamps 20 are, preferably, applied around those parts of said hose ends engaged over the taper grip sections 15 intermediate the enlargements 17 and the medial bead 14. Incidentally, it will be readily seen that compression of the hose terminal portions by the clamps 20 will conduce to force the confronting extremities of said terminal portions into mutual engagement over the bead 14, whereby any tendency to form relatively flanking grooves thereat is positively prevented; while it is to be noted the confronting ends of the hose portions 6, 7 are preferably coated with rubber cement before assembling, so that when forced into mutual contact they become united and rendered leakage-proof thereat, as well understandable by those conversant with the art.

From the foregoing the merits and advantages of the improved connector 12 should be clearly apparent, while it will be readily understood the length and diameters of said connector are both susceptible of variation, to meet different service conditions, without departing from the formative features hereinbefore specified.

Having thus described my invention I claim:

As a new article of manufacture a tubular metal connector of desirable size for joining lengths of air-brake or signal-line hose, said connector having a smooth bore and an exterior half-round bead, of approximately one thirty-second of an inch radius, medially between its ends; complemental grip sections to each side of said bead with a slight degree of outwardly-converging exterior taper; opposedly-directed bulbiform extensions beyond the grip sections, each said extension having the root portion inward and merging into the grip section by a fillet of minute radius, and the radius of the convex part of said root being materially greater than that of the fillet with the concave portion thereof of still greater radius than that of said convex part; and each bulbiform extension having a small circumferential rounding at its extremity, whereby said connector, as a unit, is easily inserted in the lengths of hose to be joined together and has no angularities conducive to the formation of leakage grooves, while the confronting ends of said hose can be brought into positive sealing juncture centrally of the bead aforesaid.

CARLETON K. STEINS.